United States Patent [19]
Kuttner et al.

[11] 3,931,787
[45] Jan. 13, 1976

[54] APPARATUS FOR APPLYING SOLID PARTICLE MATERIAL TO A STRIP

[75] Inventors: Ralph Kuttner, Fullerton; Wallace T. Morrison, Whittier, both of Calif.

[73] Assignee: Stoody Company, Santa Fe Springs, Calif.

[22] Filed: June 20, 1973

[21] Appl. No.: 371,801

[52] U.S. Cl. ................................. 118/8; 118/308
[51] Int. Cl.² ................... B05C 11/10; B05C 19/00
[58] Field of Search ............... 118/4, 8, 325, 7, 6, 9, 118/308; 72/46, 47

[56] References Cited
UNITED STATES PATENTS

| | | | |
|---|---|---|---|
| 2,981,638 | 4/1961 | Jones | 118/6 X |
| 2,989,422 | 6/1961 | Helbing | 118/7 X |
| 3,356,062 | 12/1967 | Crowe | 118/9 X |
| 3,520,276 | 7/1970 | Martin | 118/8 |
| 3,711,312 | 1/1973 | Yoshida et al. | 118/8 X |

*Primary Examiner*—John P. McIntosh
*Attorney, Agent, or Firm*—Nilsson, Robbins, Bissell, Dalgarn & Berlinger

[57] ABSTRACT

A system is disclosed for supplying particle material along a length of strip material which is then closed into a tube to provide welding wire or electrode. The strip material is moved longitudinally (while its flow rate is measured) and as it moves through a junction location, particle material is metered onto the strip, the flow rate of the particle material also being measured. The system compares the flow rates of the strip material and the particle material with a predetermined ratio to provide a control signal which controls the flow rate of the particle material accordingly. The strip material carrying the particle material is then closed to a tubular configuration to produce welding wire of improved consistency along its length. As disclosed, the system incorporates effective structures for measuring the flow of the strip material and for precisely metering the particle material.

8 Claims, 6 Drawing Figures

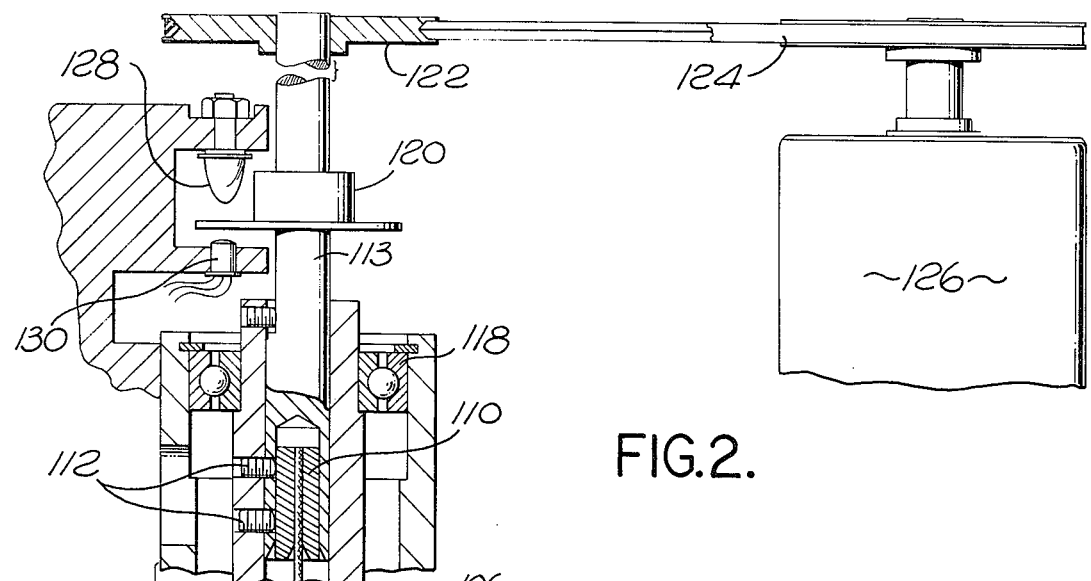
FIG. 2.
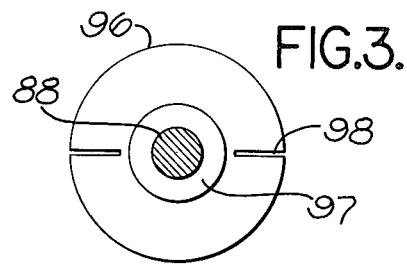
FIG. 3.
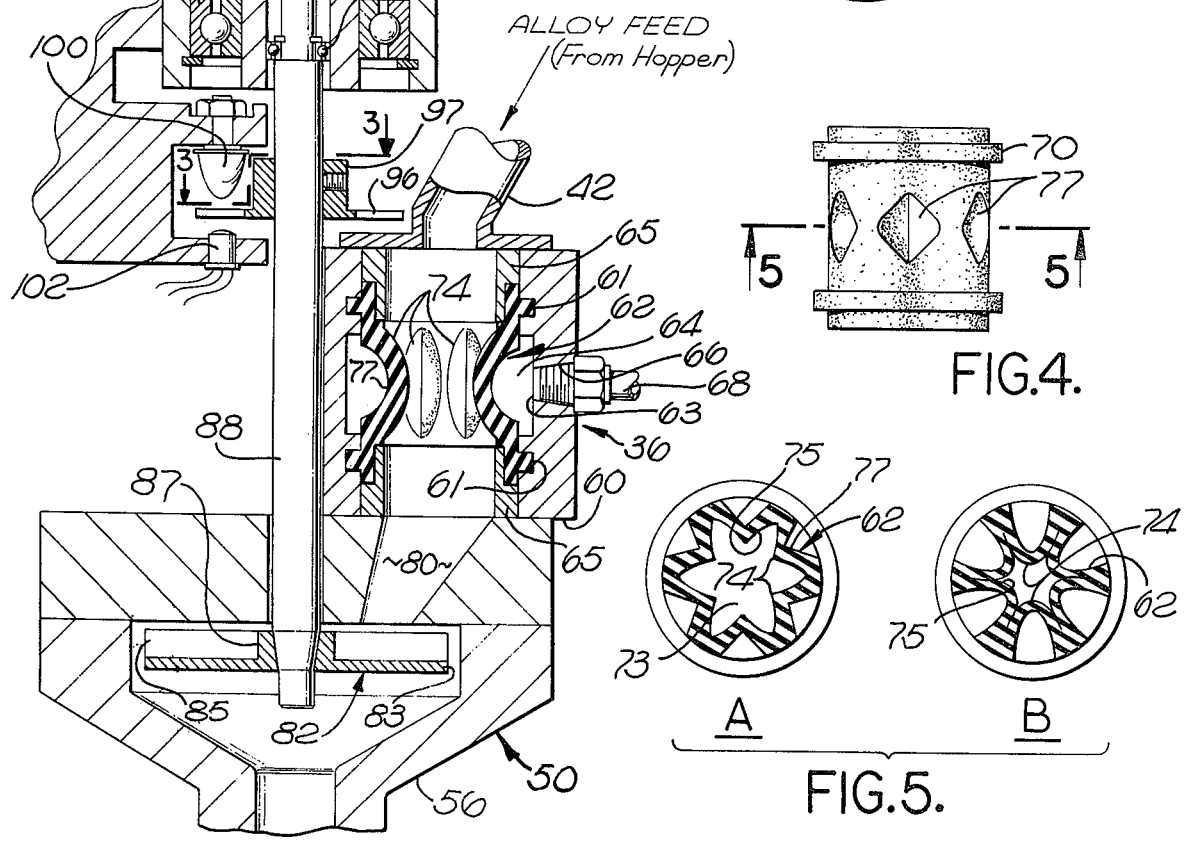
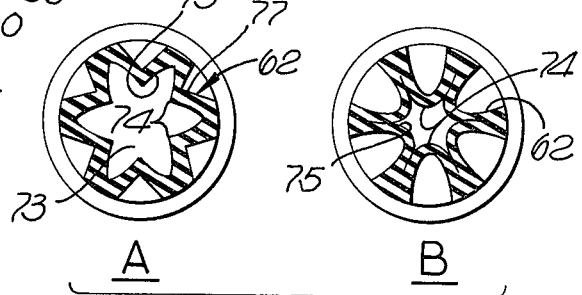
FIG. 4.
FIG. 5.

3,931,787

APPARATUS FOR APPLYING SOLID PARTICLE MATERIAL TO A STRIP

BACKGROUND AND SUMMARY OF THE INVENTION

The need sometimes arises for a system to provide a relatively precise quantity of solid, particle material along a length of solid strip material. For example, in the manufacture of welding electrode or wire, processes are well known in which solid particles, e.g., granular alloys or flux particles are deposited on a moving metallic strip, e.g., mild steel, after which the strip is tightly closed into a tubular configuration containing the particle material. This method for producing fabricated wire has been recognized to possess certain inherent advantages and is well known in the art.

With regard to welding wires generally, i.e., both fabricated and solid wires, current technology has resulted in a demand for products of greater uniformity. Of course, material deviations along a length of welding wire result in similar deviations in the resulting deposit. In many applications, such material variations are undesirable or even intolerable. Consequently, a need exists for an improved system for producing welding wire that is more uniform along its length, e.g., material content ratios are substantially constant from one section to another.

In the formation of solid welding wire, several manufacturing steps are generally involved with the result that material consistency is difficult to maintain both with respect to a single length of wire and lengths of wire produced from different billets. In the production of fabricated wires, several factors influence material consistency. The present invention relates to the recognition of such factors and the development of a system for controlling those factors to produce a relatively uniform fabricated welding wire.

Generally, the present invention is directed to a system for monitoring the flow of solid strip into a junction (at which particle material is to be received) and depositing a controlled amount of particle material on the strip to attain the desired material ratio relationship. Controlling the flow of the particle material accordingly involves apparatus for measuring flows of strip and particles, then precisely controlling the relationship between such flows. In accordance with the system, as disclosed herein, the section of the strip is monitored along with its speed of movement to develop the flow rate. Such data, along with information on the desired ratio, is processed to provide data indicative of the desired quantity of particle material. Flow of the particle material is then accordingly controlled and that flow is monitored to attain stability and improved accuracy by feedback techniques.

BRIEF DESCRIPTION OF THE DRAWINGS

In the drawings, which constitute a part of this specification, exemplary embodiments exhibiting various objectives and features hereof are set forth, specifically:

FIG. 2 is a sectional view taken centrally through a portion of the structure incorporated in the system of FIG. 1;

FIG. 3 is a sectional view taken along line 3—3 of FIG. 2;

FIG. 4 is a side elevation of a component element of the structure of FIG. 2;

FIG. 5 shows sectional views taken along line 5—5 of FIG. 4; and

DESCRIPTION OF THE ILLUSTRATIVE EMBODIMENT

As required, a detailed illustrative embodiment of the invention is disclosed herein. The embodiment merely exemplifies the invention which may be constructed in various other forms, some of which may be quite different from the disclosed illustrative embodiment. However, specific structural and functional details disclosed herein are merely representative and in that regard provide a basis for the claims herein which define the scope of the invention.

Figure 1:
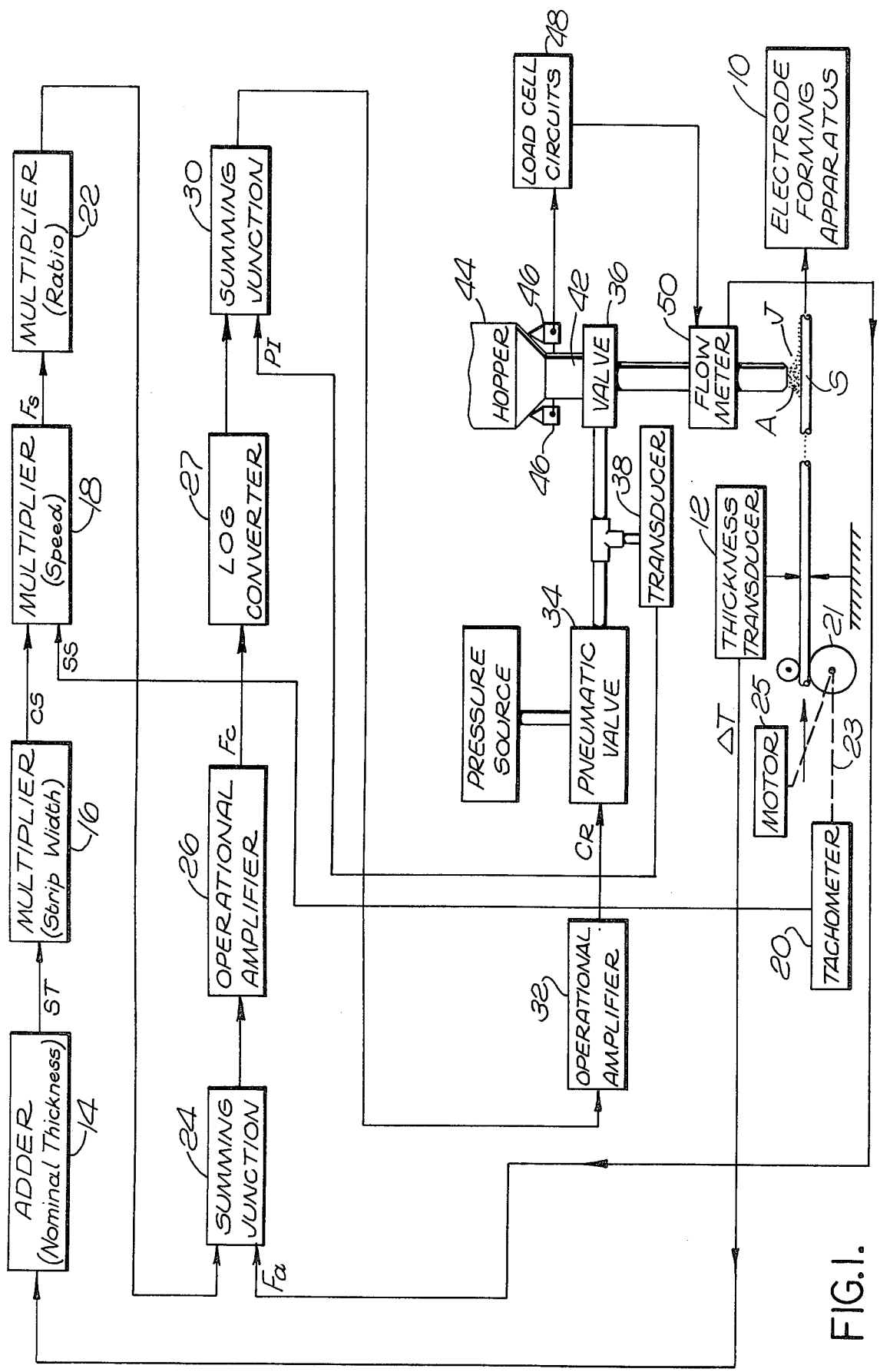
FIG. 1 is a schematic diagram of a system constructed in accordance with the present invention.

Referring initially to FIG. 1, a strip S (lower right) is indicated moving through a junction J at which particle material A is received. Generally, the present invention is directed to preserving an improved consistency or uniformity in the material ratio between the strip S and the particle material A along the length of the resulting fabricated wire.

Upon leaving the junction J, the strip S, which is preformed before the junction J (carrying the particle material A) passes to an electrode-forming apparatus 10 as generally well known in the prior art, which completes the formation of the strip S into a tubular form enclosing the particle material A to provide welding electrode. By employing this technique, a wide variety of different electrodes or welding wires can be fabricated; for example, using a strip S of mild steel and certain alloying metals (in granular or pulverized form), wires can provide a variety of different alloys. The particle materials may include substances other than alloying metals, for example, fluxes and slag formers.

Generally, in accordance herewith, the system functions to improve the consistency of the ratio R between the weight of the strip S and that of the particle material A, section by section along the length of the fabricated electrode. Generally, in accordance with convention, the ratio R as employed herein is related to material weight. In the dynamic formation of welding electrode, the desired ratio R involves flow rates rather than mass quantities. That is, if the flow rates of the strip S and the particle material A to the junction J are maintained consistently at the desired ratio R, the resulting electrode will possess the desired uniform material ratio R. Maintaining the flow rates to closely approximate the desired ratio R is generally somewhat characteristic of the present invention. The individual parameters of control in the illustrative embodiment include the desired ratio R, the flow rate Fs of the strip S, and the flow rate Fa of the particle material A. Of course, as indicated above, the ratio R is equivalent to Fa/Fs as the time quantities cancel. The relationship $Fa/Fs = R$ translates into: $Fa - RFs = 0$, which is the expression involved in the implementation in the illustrative system of FIG. 1.

The density of commercial forms of the strip S has been determined to be quite consistent. Accordingly, in the disclosed embodiment, density is assumed constant while concern is directed to other variables, i.e., the varying cross section of the strip S and its varying speed. Generally, the cross sectional variation is primarily accounted for by thickness variations in the strip S. For example, in one form of strip, variations of ±7.5 percent are not uncommon. The thickness of the strip S is sensed by a thickness transducer 12 (lower center) which provides an electrical signal that is indicative of deviations from a nominal thickness. For example, assuming a strip of 0.010 inch thickness, the transducer 12 provides signals indicative of deviations from that nominal thickness. Such transducers are well known in the materials-processing art and are readily available commercially.

An output analog signal $\Delta T$ from the thickness transducer 12 is applied to an accumulator or analog adder 14 (upper left) which registers the nominal thickness of the strip S and algebraically combines that value with deviations represented by the signal $\Delta T$. The adder 14 provides a signal ST (indicative of the strip thickness) to a multiplier 16 which registers the width of the strip S in process and multiplies such a value by the strip thickness (signal ST) to provide an output signal CS, that is indicative of the cross section of the strip at a location immediately before (upstream) of the junction J. The signal CS is applied to a multiplier 18 which also receives a signal SS (indicative of the speed of the strip S) from a tachometer 20 (bottom central). The analog multiplier 18 combines the signals CS and SS as factors to provide an output signal Fs which indicates the flow rate of the strip S into the junction J.

The tachometer 20 which provides the signal SS is coupled to a drive wheel 21, as indicated by a dashed line 23. A variety of drive arrangements are well known and are used in the commercial production of fabricated wire. As a result, the drive wheel 21, with a motor 25, is somewhat symbolic in representing a form of well known structure to actuate the strip S in a direction along its length. It is also perhaps noteworthy that some preliminary forming by an apparatus, as represented by the electrode-forming apparatus 10, may occur prior to the junction J. Again, various techniques are known and used.

The flow rate of the strip S, as represented by the signal Fs, is applied from the multiplier 18 to a multiplier 22 which registers signals representative of the desired ratio R. Consequently, the output signal FsR from the multiplier 22 is representative of the product of the flow rate Fs and the ratio R. Thus, the term FsR of the equation $FsR - Fa = 0$ is developed as a representative signal. The signal FsR from the multiplier 22 is applied to a summing junction 24 along with a signal Fa which is representative of the flow rate of the alloy or particle material A. The signal Fa is applied in a negative or opposed relationship to the signal FsR with the result that the summing junction 24 provides a zero-level output when the flow rates are at the desired ratio relationship. Deviation from that condition results in a signal which is applied through: an operational amplifier 26, a log converter 27, an internal-loop summing junction 30, and an operation amplifier 32 to control a pneumatic valve 34 which in turn acts to vary the flow rate of the particle material A by means of a valve 36.

Considering these elements somewhat more specifically, the operational amplifier 26 functions as an integrator or null detector to provide a stabilized control signal FC that is indicative of the first approximation of necessary correction in the flow rate as represented by the signal Fa. The correction signal FC undergoes a logarithmic conversion by the converter 28 in view of the fact that the valve 36 is exponentially responsive. The valve 36 as utilized in the disclosed embodiment will be considered in detail below; however, to appreciate the function of the logarithmic converter 28, it should be understood that the response curve of the valve 36 is exponential.

The output from the converter 28 is applied to the summing junction 30 with a pressure-indicating signal PI provided from a transducer 38 and indicative of the pressure applied to the valve 36 under control of the pneumatic valve 34. Thus, a feedback loop is provided from the transducer 38 to the summing junction 30 with the result that a stable correction signal CR is supplied from the operational amplifier 32 to the pneumatic valve 34. Thus, the actual correction signal CR from the amplifier 32 is stable and is logarithmically corrected to provide linear response by the valve 36. The signal CR applied to the pneumatic valve 34 varies the pressure actuating the valve 36 by varying the flow from a pressure source 40 to the valve 36, the pneumatic system including an exhaust orifice as well known.

The valve 36 (described in greater detail below) is connected to a gravity-flow duct 42 from a hopper 44 which is borne on load cells 46 that are electrically connected to load cell circuits 48. The load cells 46 sense the load of the hopper 44 and provide a signal through the circuits 48 that is indicative of the contents of the hopper 44. The weight-indicating signal from the circuits 48 is applied to a flow meter 50, which senses the flow of particle material A to provide the representative signal Fa as introduced above. The structural details of the flow meter are considered below.

Prior to considering the operation of the system, a general comment is pertinent. For adequate control, the system must respond rapidly to variable parameters, e.g., the thickness of the strip S. In that regard, in one embodiment of the present invention, the strip S moves at a linear rate of some 300 feet per minute so that response time must be relatively short. As a consequence, the solid-particle valve 36 and the flow meter 50 must have relatively fast response times. Essentially, each of these structures constitute a subsystem as described in detail below. However, in considering the operation of the system of FIG. 1, it is to be understood that structural elements embodied therein possess some rather special characteristics in relation to conventional devices.

In using the system of the illustrative embodiment, certain adjustments or set-up operations are to be performed preliminarily. Specifically, the value of the nominal thickness of the strip S is registered in the adder 14 which, as suggested above, may comprise an analog accumulator. The width of the strip that is to be employed is registered in the multiplier 16 as an analog that is multiplied by the signal ST from the adder 14. Another setting involves the desired ratio R which is registered in the multiplier 22. Thus, the selected strip size and ratio are set into the system prior to operation.

Next, the strip is threaded into the system, e.g., over the drive wheel 21, through the thickness transducer 12, past the junction J and into the electrode-forming apparatus 10 which, as indicated above, may include a variety of structures including additional drive rollers. Upon completion of these preliminary operations, the system is energized to actuate the drive wheel 21 (as well as any other drive wheels) to begin moving the strip S through the junction J. It is to be appreciated that some small loss of material may occur during the start-up operations, prior to the time that the system has accomplished stable control.

After a very brief interval of operation that is required for the strip S to attain speed, the valve 36 is actuated (manually or otherwise) with the result that subsequent control is automatic. Thereafter, the flow through the valve 36 is sensed by the flow meter 50 to provide a representative signal Fa that is applied to the summing junction 24. As indicated above, the flow rate of the strip S and the desired ratio R are formulated as a representative composite electrical signal FsR which is applied to the summing junction 24 in opposition to the signal Fa. The resulting signal, as indicated above, is integrated by the operational amplifier 26 and logarithmically converted by the converter 28. The summing junction 30 receives the output from the converter 28 along with a monitoring pressure signal PI to servo the system to the desired pressure. Of course, these signals are applied in opposition at the summing junction 30 with the result that the difference between the signals is acted upon by the operational amplifier 32 to provide the actual control signal CR which drives the pneumatic valve 34. Consequently, the valve 36 attains the desired flow of air to produce a pressure in the valve 36 for responsively controlling the flow of particle material A to the junction J. The system then responds to maintain the flow appropriate to preserve the desired ratio R. As the flow rates are controlled to maintain the desired ratio, the resulting wire, viewed along its length, has a substantially uniform material content. Thus, the desired wire is produced.

Pursuing the detailed explanation of the system, reference will now be made to FIG. 2 for an explanation of the electromechanical apparatus embodied in the valve 36 and the flow meter 50. In FIG. 2, the duct 42 is fragmentarily represented as a tube extending upwardly from the valve 36. Immediately below the valve 36 are the components affixed together as the flow meter 50. That is, particle material passes from the duct 42 through the valve 36 and the flow meter 50 to pass freely from an inverted conical housing 56. The solid-particle valve 36 and the solid-particle flow meter 50 will now be individually treated.

The particle valve 36 incorporates a cylindrical metal housing 60 which defines internal annular grooves 61 to matingly receive flanges of a somewhat cylindrical resiliently-deformable valve member 62. The housing 60 also defines a central, internal annular groove 63, which with the member 62 defines an annular space 64. The space 64 receives air through a port 66 which threadably receives a line 68. Thus, the pressure developed in the space 64 varies as the pressure in the line 68 which in turn varies as the state of the valve 34 (FIG. 1).

The resiliently-deformable member 62 is fixed in the housing 60 by inserts 65 which extend over the flanges 68. As a result, pressures developed in the space 64 are applied about the exterior of the resiliently-deformable member 62 to variously deform or inflate the exposed portions.

The resiliently-deformable member 62 indicated above to be of a generally cylindrical configuration is in detail a rather special shape. The wall thickness of the somewhat cylindrical member 62 (FIG. 4) between flanges 70 and 72 is generally uniform. However, that cylindrical portion is interrupted by an annular arrangement of uniformly-spaced internally-extending radial segments 74. As a consequence, the open space 73 (FIG. 5) through the member 62 is defined somewhat as a star (FIG. 5). In one operating embodiment, six radial segments 74 define a six-pointed star, of varying size, depending upon the degree to which the segments 74 are inflated. The valve member 62 is illustrated fully open in FIG. 5A and somewhat closed in FIG. 5B. It appears to be somewhat critical to operation that the segments 74 possess a somewhat triangular or sectorial shape so that upon inflation the facing sides 75 of adjacent members 74 become abuttingly engaged (FIG. 5B) in sealing relationship. Accordingly, as indicated in FIG. 3, the segments 74 resemble segments of an edge-tapered disk backed by open spaces 77. It has been determined that an improved form of operation is attendant an integral member 62 consisting substantially entirely of natural rubber.

In the operation of the valve 36 to control the flow of solid particle material, certain other characteristics are perhaps noteworthy. Specifically, as indicated above, the response of the valve tends to be logarithmically related to the pressure applied in the space 64. As a related consideration, the valve has been determined to have considerably better control characteristics as it approaches a closed state (FIG. 5B) than when approaching an open state (FIG. 5A). As a consequence, in certain applications, it may be desirable to use a plurality of the valves 36 in a parallel or shunt relationship so that more stable operation tends to occur with the valves somewhat closed.

As a somewhat unexpected feature of the valve 36, preliminary testing suggests that the member 62 tends to resist abrasion although the particle material may be substantially abrasive. This fact may suggest that particles tend either to fall freely through the opening 73 defined by the member 62 or move relatively little when adjacent to it. In any event, an effective and durable valve for solid particle material is provided in the system.

Particles passing through the member 62 in the valve 36 (FIG. 2) enter a passage 80 from which they fall upon a rotating wheel 82. The wheel 82 might be analogized to a rotary compressor wheel in that, as it revolves, it receives the particle material A, dispersing it centrifugally. As the particle material passes from the wheel 82, work is imparted and a reactive force is developed on the wheel 82. Generally, the solid-particle flow meter 50, as disclosed herein, utilizes that reactive force to develop the electrical signal Fa, that is indicative of mass flow.

The wheel 82 includes a thin solid disk 83 on the bottom side concentric with the shaft 88, and carries integral vanes 85 extending from a hub 87. The revolving shaft 88 is supported by bearings 90 and 92 in telescopic relationship with a rotary sleeve 94. The free space of the shaft 88, between the sleeve 94 and the wheel 82, receives a light-mask disk 96, defining slits 98 (FIG. 4) and affixed to the shaft 88 at a hub 97. The disk 96 functions as a light gate to indicate angular positions of the shaft 88. In that regard, a light source 100 is affixed on the upper side of the disk 96, aligned in opposing relationship to a light sensor 102 on the lower side of the disk 96.

The shaft 88 terminates above the bearing 92 at an end 104 which receives a torsion spring 106. Specifically, the torsion spring 106 is clamped into engagement with the shaft 88 by structure including a bolt 108 with spring wire thru locked in place. The upper end of the torsion spring 106 is similarly received in a mounting fixture or collet 110 which is locked to the sleeve 94 by set screws 112 extending through a coaxial shaft 113. The sleeve 94 also receives a set screw 115 to further lock the shaft 113 in position. Support for the shaft is provided by a stationary cylindrical mount 114 carrying bearings 116 and 118 positioned adjacent the ends of the mount 114. Consequently, the shaft 88 may be rotated in relation to the sleeve 94 (by placing the spring 106 in torsion), however, the shaft 88 along with the sleeve 94 is revolved on the bearings 116 and 118 within the cylindrical mount 114.

The upper end of the shaft 113 extends from the sleeve 94 and the cylindrical mount 114 to carry a disk 120 and afford connection to a source of rotary power. Specifically, above the mount 114, the shaft 110 carries a light disk 120 (similar to disk 96) and is terminated at a pulley 122 which is connected by a belt 124 to a drive motor 126. At locations adjacent the disk 120, the rigid frame 131 of the system supports a light source 128 and a light sensor 130 on opposed sides of the disk 120.

Considering the operation of the electro-mechanical portion of the flow meter as described above with reference to FIG. 2, as particle material flows through the passage 80, it falls on the wheel 82 to be thrown off centrifugally as in an impeller action. The reaction to propelling the particle material is a force on the wheel 82 which displaces the shaft 88 from the sleeve 94 by stressing the torsion spring 106. The angular offset between the shaft 88 and the sleeve 94 is thus indicative of the developed reaction force, and is manifest at the light sensors 102 and 128.

When no angular offset exists between the similar disks 96 and 120, the slits in the disk 96 align with the slits in the disk 120. Consequently, the light pulses sensed at the sensors 102 and 130 are coincident and indicate no reactive force. However, as flow occurs, an angular offset develops, and there is a displacement between the slits in the disks 96 and 120. Specifically, the disk 120 provides a reference in the sense that when the slit of the disk 120 passes between the source 128 and the sensor 130, an electrical reference pulse is generated. Assuming that some angular offset exists, a brief interval later, the slit in the disk 96 passes between the light source 100 and the sensor 102. Accordingly, an information pulse is generated. The space between the two pulses (reference and information) is indicative of the angular offset of the shaft 88 from a reference position. As a consequence, the two spaced-apart pulses may be employed as described below to generate a single pulse, the width of which is modulated to indicate the flow through the duct 80.

Figure 6:
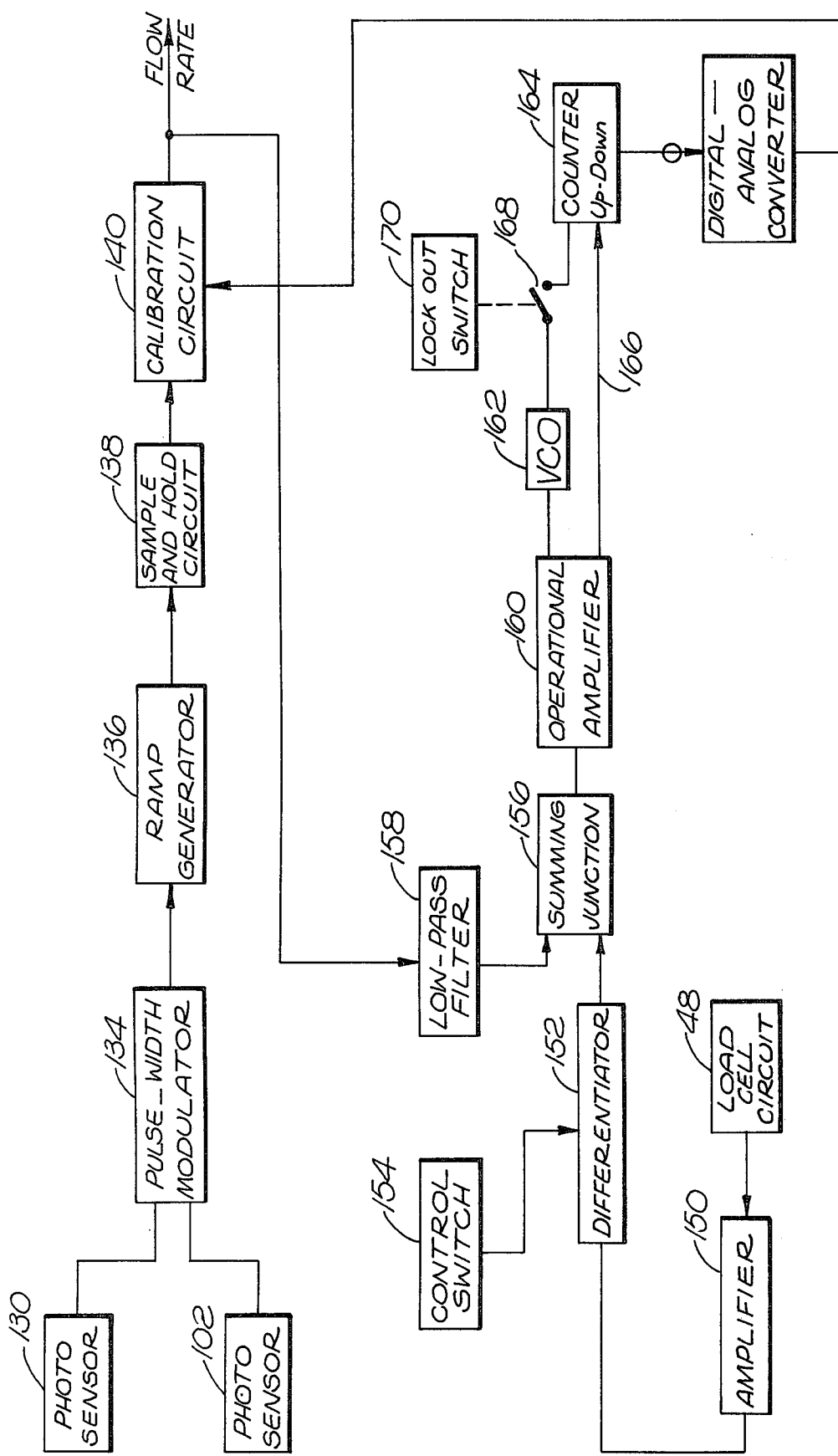
FIG. 6 is a block diagram of a component portion of the system of FIG. 1.

Considering the system for processing the signal pulses provided by the light sensors 102 and 130, reference will now be made to FIG. 6 in which the sensors are represented (upper left) as blocks. The output pulses from the sensors 130 and 102 are applied to a pulsewidth modulator 134 which produces a regular pulse, the duration of which is indicative of the time between received pulses. Various forms of satisfactory pulsewidth modulators are well known in the prior art and may comprise simply a bistable multivibrator, or flip flop, with differentiating input circuits.

The output from the modulator 134, consists of pulses having a time duration that is indicative of flow. These are applied to a ramp generator 136 which is synchronized in accordance with the speed of rotation of the shaft 113 as well known in the art to attain an analog amplitude equivalent the duration of the received pulse. The analog signal is applied to a sample-and-hold circuit 138 as well known in the prior art. Essentially, the ramp generator 136 converts the pulse-width information into amplitude representative information or an analog signal, which is employed to repeatedly set the sample-and-hold circuit 138 in order to provide a continual analog output that is indicative of mass flow. Consequently, the output from the sample-and-hold circuit 138 is an analog signal that represents the flow rate of the particle material.

In some instances, the analog signal from the sample-and-hold circuit 138 may be adequate; however, to provide improved accuracy, a calibration circuit 140 is introduced to scale the signal repeatedly in accordance with another measurement. Generally, the calibration circuit 140 scales the signal from the sample-and-hold circuit in accordance with a signal derived from the rate at which the hopper 44 (FIG. 1) dispenses material. Specifically, the hopper 44 is carried on load cells 46 which drive a load cell circuit 48 to indicate the weight of the hopper and its contents. The load cell circuit 48 is indicated in FIG. 6 (lower left). Accordingly, signals indicative of the weight of the hopper and its contents are provided from the load cell circuit 48 through an amplifier 150 to a differentiator 152. The differentiator 152 is actuated by a control switch 154 whereby operation of the differentiator 152 is limited to intervals when particle material is flowing from the hopper. Control may be manual or automatic.

Functionally, the differentiator 152 provides an output signal that represents the rate-of-change in the weight of the hopper and the contents of the hopper. Consequently, the differentiator provides a signal indicative of the mass flow rate of material from the hopper. That signal is applied to a summing junction 156 along with a signal from the calibration unit 140 which is passed through a low-pass filter 158. The output of the summing junction 156 is applied to an operational amplifier 160 which drives a voltage-controlled oscillator 162. An "up-down" counter 164 is connected to be driven by the voltage-controlled oscillator 162, the sense of the count being determined by a signal supplied through a conductor 166 from the operational amplifier 160. A switch 168 couples the voltage-controlled oscillator 162 to the counter 164 and is controlled by a lock-out circuit 170 so that the counter is altered only during intervals of detectable flow to a digital-analog converter 174 to provide an analog signal serving to regulate the calibration circuit 140. Such control may be manual or automatic. Thus, the system functions to provide a stable signal from the calibration circuit 140 which accurately reflects the flow of the particle material.

In view of the above considerations, it may be seen that the system hereof may be embodied in a form to accurately control and maintain a ratio of particle and linear material. Recapitulating, with reference to FIG. 1, it may be seen that the closely controlled flow rates of the strip S and the particle material A provided at the junction J enables a welding electrode having good consistency in the ratio.

The system, integrating the accurate flow meter, e.g., as described above, and an effective particle-substance valve in the total system as described herein may be seen to provide a truly improved machine for producing welding wire that could not be produced using conventional production methods.

It is to be noted that although a single junction J is indicated at which a single quantity of particle material A is received, several junctions could be provided. That is, it may be advisable to employ several streams of particle material onto the strip S to obtain a desired material configuration prior to closing the strip S to define the wire. Of course, various other modifications and embodiments will be readily apparent to those skilled in the art. Accordingly, the scope hereof should be interpreted in accordance with the claims as set forth below.

What is claimed is:

1. A system for joining solid particle material with solid strip material at a junction, in accordance with a predetermined weight ratio, comprising:
   means for moving said strip material to flow relative to said junction;
   means for indicating the flow rate of said strip material relative to said junction in terms of weight per unit of time;
   means for flowing said solid particle material onto said strip material at said junction;
   means for sensing the flow rate of said particle material in terms of weight per unit of time and including an impeller for forcefully propelling said material and means for sensing the reactive force on said impeller as an indication of said flow rate of said particle material;
   means for comparing the flow rates of said strip material and said particle material with said predetermined weight ratio to provide a control signal; and
   means for controlling the relationship between said means for moving and said means for flowing in accordance with said control signal.

2. A system according to claim 1 wherein said means for indicating the flow rate of said strip material includes means for sensing the thickness of said strip material to provide a thickness signal; means for sensing the moving speed of said strip material to provide a speed signal; and means for combining said thickness and speed signals.

3. A system according to claim 1 wherein said means for sensing the reactive force comprises a rotary structure affixed to said impeller means and including a torsion spring for yielding with said reactive force, and means for sensing the yield of said torsion spring.

4. A system according to claim 1 wherein said means for controlling the relationship between said means for moving said means for flowing includes a particle material flow regulator for passing a variable flow of solid particle.

5. A system according to claim 4 wherein said particle material flow regulator comprises a resiliently-deformable passage member defining inward radial extensions and signal-controlled means for pressurizing the exterior of said passage member to inflate said radial extensions.

6. A system according to claim 5 further including a logarithmic converter connected to receive said control signal and to actuate said signal-controlled means.

7. A system according to claim 1 wherein said means for sensing the flow rate of said particle material includes a hopper from which said particle material flows; means for providing weight signals indicative of the weight carried by said hopper; differentiating means for differentiating said weight signals to provide differentiated weight signals; and means for calibrating said means for sensing the flow rate of said particle material in accordance with said differentiated weight signals.

8. A system according to claim 1 wherein said means for comparing includes means for summing signals representative of said flow rates in opposition to provide a control signal.

* * * * *